US005896095A

United States Patent [19]

Hill et al.

[11] Patent Number: 5,896,095

[45] Date of Patent: Apr. 20, 1999

[54] ELECTRONIC LOCK WITH ACCESS

[75] Inventors: James D. Hill; Herman W. Miracle, Jr., both of Lexington, Ky.

[73] Assignee: Mas-Hamilton Group, Lexington, Ky.

[21] Appl. No.: 08/852,774

[22] Filed: May 7, 1997

[51] Int. Cl.[6] .................................. G06F 7/04; G07D 7/00

[52] U.S. Cl. .................................. 340/825.31; 340/825.34

[58] Field of Search .......................... 340/825.31, 825.69, 340/825.72, 725.34, 825.32; 235/382.5, 382, 380; 380/23, 24; 70/278, 333 R; 361/172; 341/35; 365/189.05; 364/DIG. 1

[56] References Cited

U.S. PATENT DOCUMENTS

| | | | |
|---|---|---|---|
| 4,511,946 | 4/1985 | McGahan | 361/172 |
| 5,488,660 | 1/1996 | Dawson et al. | 340/825.31 |
| 5,712,626 | 1/1998 | Andreou et al. | 340/825.31 |

*Primary Examiner*—Michael Horabik
*Assistant Examiner*—Jean B. Jeanglaude
*Attorney, Agent, or Firm*—Frost & Jacobs LLP; Ron Letson

[57] ABSTRACT

An electronic lock is provided with an emergency technique by which the lock may be possibly opened in the event that the electronic memory used to store the authorized combinations for operation in unlocking of the lock becomes corrupted, damaged or is unable to provide a valid read of storage locations containing combinations. Upon the determination that an invalid read has occurred and that the invalid read has been verified for at least a plurality of additional read cycles, the lock is conditioned to accept an otherwise inoperable master combination for purposes of opening the lock. Under the prescribed conditions, the master combination is capable of opening the lock and providing access to the interior of the container carrying the lock, thus permitting either replacement or repair of the lock and also simultaneously eliminating the need for drilling or other destructive access to the interior of the container.

6 Claims, 4 Drawing Sheets

ELECTRONIC LOCK WITH ACCESS

FIELD OF THE INVENTION

This invention relates to electronic locks and more specifically to a technique which eliminates the need to drill the container or the lock in order to open such a lock upon failure of its memory or any corruption of stored data within the memory.

BACKGROUND OF THE INVENTION

Electronic locks typically have more than one memory. The typical electronic lock has a microprocessor which either has an incorporated or an associated read-only memory as well as at least one other memory, which is a non-volatile type memory for storage of data necessary to the operation of the lock. Combinations are written to or stored in and further read from the non-volatile memory, typically an Electrically Erasable Programmable Read-Only Memory (EEPROM), during lock operations. The stored data may be properly written to the memory; and, due to some subsequent event, one or more of the data bytes may become corrupted or damage may occur to the memory at the location of such stored data.

If, during the normal operation of the electronic lock, a combination is not readable from the memory or corrupted data representing an incorrect combination is read from the memory, then the lock is unopenable. Whenever the lock does not respond to a combination, the lock and/or safe typically must be drilled to gain access to the locking mechanism of the lock in order to open the container. Drilling a container and the lock thereon not only is expensive but damages the container door and the lock, thereby requiring repair or replacement of the container door and replacement of the lock at considerable inconvenience and expense.

Corrupted data may result from such events as electrostatic discharge (ESD), memory failure or any other damage which may render a particular memory location incapable of retaining the data stored therein.

Anytime data is stored in the memory of the electronic lock, the data is read from a buffer, internal to the microprocessor controlling the operations of the lock, and then under the control of the microprocessor, written into the memory along with a Cyclic Redundancy Check (CRC) byte. There is a CRC byte associated with each of the buffer entries recorded into memory.

Immediately after the data is recorded into the memory, a confirmation read operation is initiated in which the data just recorded is reread from the memory for purposes of confirming the accuracy of the information stored. The CRC byte is calculated based upon the data which is read from the memory, compared with the CRC byte stored in the previous storage cycle, and reread from the memory. If the CRC bytes and the data both compare, at this point the data is assumed to be written in correct form and further actions of the microprocessor proceed from that point. In the event that there is a discrepancy, there is an immediate rewriting of the information from the buffer into the lock microprocessor control memory and that rewritten information then is read for confirmation, as previously described.

At a later time when the lock is being operated to open the lock and the related container upon which it is installed, the data may be read from the memory. The data, typically under these circumstances, would be the stored combination which is the authorized combination. Any combination entered into the lock must compare equal to the stored or authorized combination and, therefore, the combination must be retrieved accurately from the memory.

If the calculated CRC byte and the retrieved CRC byte associated with the data read from the memory compare favorably, then the data bytes associated with the retrieved CRC byte are assumed to be correct and the electronic controls of the lock then further process that information and compare the retrieved combination with the combination entered into the lock. However, if the retrieved CRC byte and the calculated CRC byte do not compare, this no-compare condition serves as an indicator that there has been a failed read operation and the lock is incapable of proper operation. Accordingly, the lock will not open unless there is another combination for another user properly programmed into the lock. In the event that either there is no other combination which may be tried or the memory has been so thoroughly corrupted that any other combinations similarly are detected as errors, then the alternative is to drill the container and the lock to gain access to the lock mechanism and manipulate the lock mechanism in such a way as to open the container. Other data reading and writing validity checking techniques may be used. Alternative techniques include Longitudinal Redundancy Check (LRC), check sum, parity and Brown Peterson codes. Other techniques may be used if desired to verify the accuracy of data read or written from or to a memory.

OBJECTS OF THE INVENTION

It is an object of the invention to provide a mode of operation for an electronic lock that will permit access to the container whenever the memory reads indicate either a memory failure or corrupted data.

It is a further object of the invention to permit the use of an emergency combination to gain entry only if the lock malfunctions as a result of either a reading of corrupted data or a substantial malfunction in the memory.

It is a further object of the invention to overcome the need to drill a container and lock whenever the electronic lock memory malfunctions or only produces corrupted data.

SUMMARY OF THE INVENTION

An electronic lock typically has at least a ROM or read only memory, a volatile RAM or random access memory and an Electrically Erasable Programmable Read-Only Memory (EEPROM). The ROM typically stores the operational programming for the microprocessor of the electronic lock while the volatile RAM stores data only needed during one particular power-up cycle or lock, with the EEPROM storing data which must be preserved from operating cycle to operating cycle.

There are instances where data stored in either the EEPROM or the ROM may be corrupted and cannot be reliably read from the memory. Anytime a memory location is read and the CRC byte for a particular data storage entry does not check or compare equal with the calculated value of the CRC byte based upon the data retrieved, a reread of that data storage location is immediately initiated. The reinitiation of the read cycle is to determine whether the failure to compare is repeatable or whether it is a transient condition. The rereading of the memory storage location continues for a predetermined number of reread cycles or until a proper CRC byte comparison occurs. In an attempt to retrieve valid data, if a reread results in a CRC byte comparison, then the repetitive rereading cycles are terminated and the data retrieved assumed to be valid.

Upon the other hand if proper comparison of the CRC byte does not occur on any of the reread cycles, the CRC byte failure to compare condition is indicated by the error mode flag set by the microprocessor. The setting of the error mode flag conditions the microprocessor to branch through a subroutine which will accept only a combination uniquely configured for consideration only in the event that an error mode flag has been set. Based upon the complete entry of the emergency combination and the error mode flag being set, the electronics then will retrieve or attempt to retrieve the counterpart authorized combination from a plurality of locations in the memory.

Even after some incident which has corrupted data in other locations within the memory, the multiple storage locations in the memory for the emergency combination increase the probability that a valid and correct combination can be retrieved from the memory.

If the emergency combination is not retrievable, the lock memory is so corrupted or damaged that the lock is inoperative and drilling the container and the lock may be the only viable option with respect to gaining access to the interior of the container. However, if the emergency combination is retrievable from one of the memory storage locations and the CRC byte for that combination indicates that valid data has been retrieved, then the lock is openable. Once the lock has been opened, the lock may be either replaced or repaired without the necessity to drill the container or the lock, thus saving a considerable amount of time, inconvenience and money for the lock owner.

A more complete understanding of the invention may be had by reference to the accompanying drawings and detailed description of the invention to follow.

A BRIEF DESCRIPTION OF THE DRAWINGS

DETAILED DESCRIPTION OF THE PREFERRED EMBODIMENT OF THE BEST MODE CONTEMPLATED BY THE INVENTORS

Figure 1:
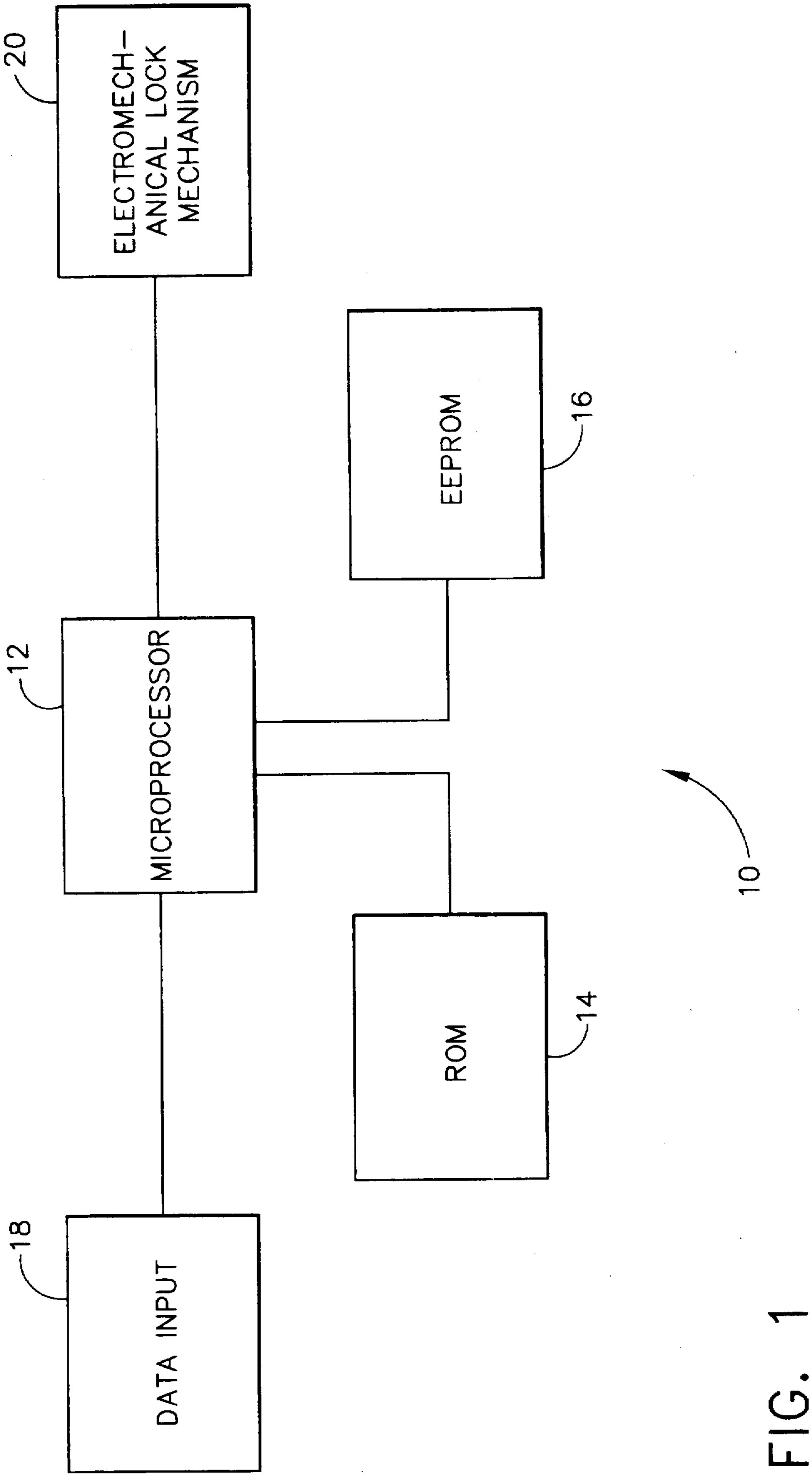
FIG. 1 is a block diagram illustration of the electronic controls for an electronic lock and their relationship to the lock mechanism.

Referring initially to FIG. 1, an electronic lock having both an electrical control portion and an electromechanical portion is illustrated. The overall system representing an electronic lock is indicated by reference numeral 10. The electronic control portion of the lock 10 includes a microprocessor 12 which typically has interconnected therewith a ROM 14, an EEPROM 16 and a data input 18. It should be understood that the read only memory 14 may be separate from the microprocessor 12 depending on the choice of the microprocessor 12 implemented.

The microprocessor 12 is interfaced with the electromechanical portions 20 of the lock 10 to cause the lock mechanism to function.

Microprocessor 12 is controlled and operated by a system program typically stored in the ROM 14. Data which either is necessary or desirable for the operation of the microprocessor to control the lock typically is stored in the data storage memory 16. Data storage memory 16 may be a volatile random access memory or RAM or alternatively may be a non-volatile random access memory or NVRAM in the form of an EEPROM. In both cases data may be stored for use by the microprocessor 12 in its operations. Particularly, the data storage 16 will provide the residence for storing combinations that are authorized to cause the lock 10 to open. The data storage memory 16 must be NVRAM for the storage of combinations for future use.

A data input 18 is provided to interface between the operator and the microprocessor 12. The data input 18 may take one of various forms such as, for example, the inputting of data by means of a dial manipulated stepper motor providing pulses, a pulse emitter arrangement, a keypad, a key and key socket, or a card reader. All of these forgoing devices listed as data input are conventional and need not be further described in detail for the purposes of this invention.

Figure 2:
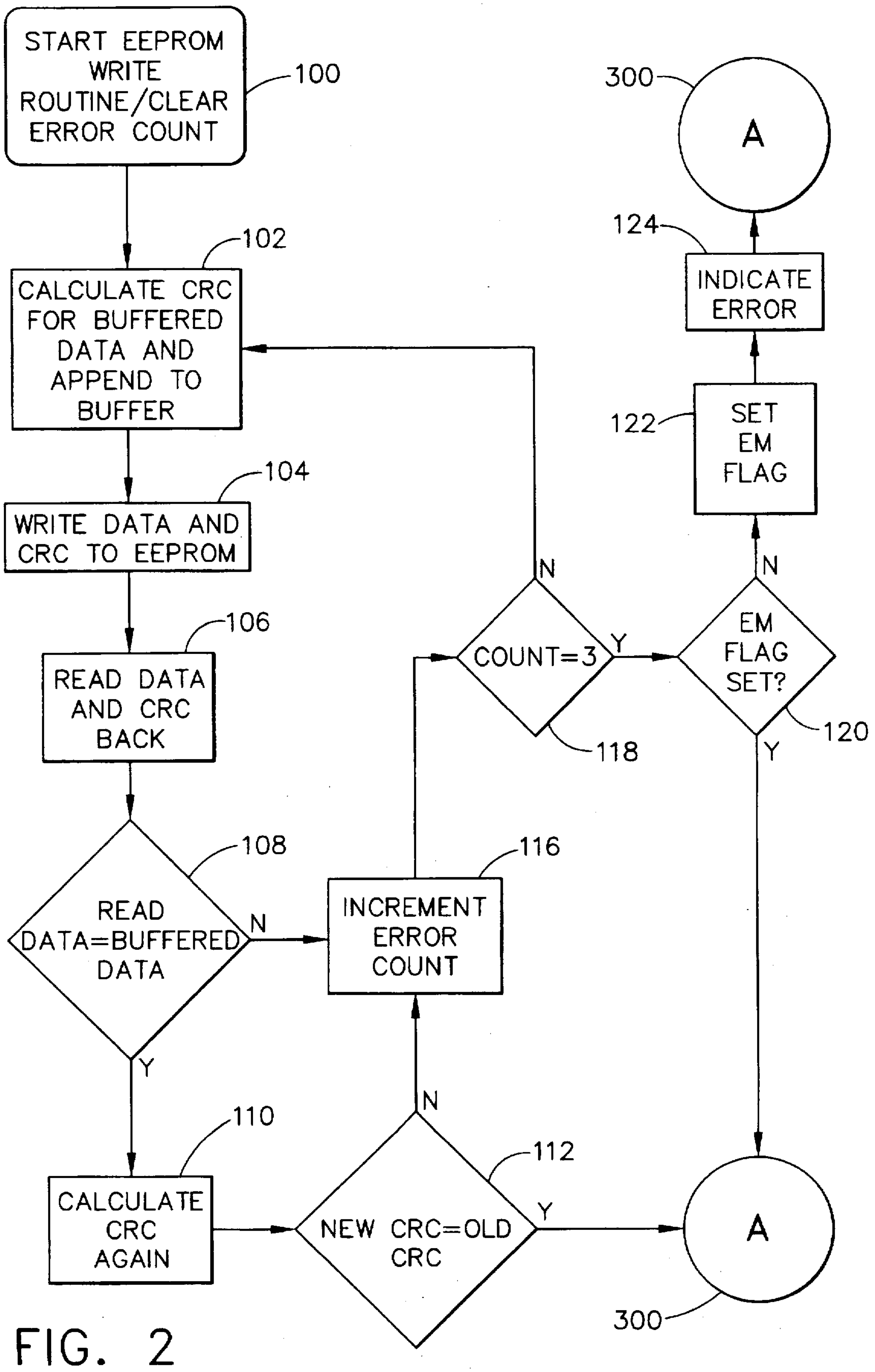
FIG. 2 is a flow diagram of the process of writing and verifying data written to a memory within the lock.

With reference to FIG. 2, the operation of the lock 10 will be described. The microprocessor 12 of the lock 10, discussed with respect to FIG. 1, operates under the control of an operational program stored in the read-only memory and accessible by the microprocessor 12.

Referring again to FIG. 2, illustrated is the routine in which the microprocessor 12 performs under the control of the program contained and stored in the read-only memory 14. In operation 100, the write routine for the EEPROM 16 is initiated and the error count is cleared. Upon the writing of data from buffers in the microprocessor 12 into the EEPROM 16, a Cyclical Redundancy Check (CRC) byte is calculated based upon the data which is in the buffer of the microprocessor 12 and which is to be written to the EEPROM 16. The CRC byte is appended to the buffered information and is prepared for the write operation in operation 102.

In operation 104, the data which has been assembled, together with the CRC byte, is written into the EEPROM 16 as a single package of data. Upon the completion of the writing of the data in operation 104, the data is immediately read back from the EEPROM 16, in operation 106, together with the associated CRC byte. Once the data which has just previously been stored has been retrieved through the reading of operation 106, the data retrieved or read from the EEPROM 16 is compared with the data that has been buffered in the microprocessor 12 for storage. This comparison occurs in operation 108. If the data is correct, i.e., compares with the data from the buffer, then the data which has been retrieved is used to calculate the CRC byte again in operation 110. Following the calculation of the CRC byte in operation 110, the newly calculated CRC byte is compared in operation 112 with the old CRC byte, as was recorded in the EEPROM 16 in operation 104.

Figure 4:
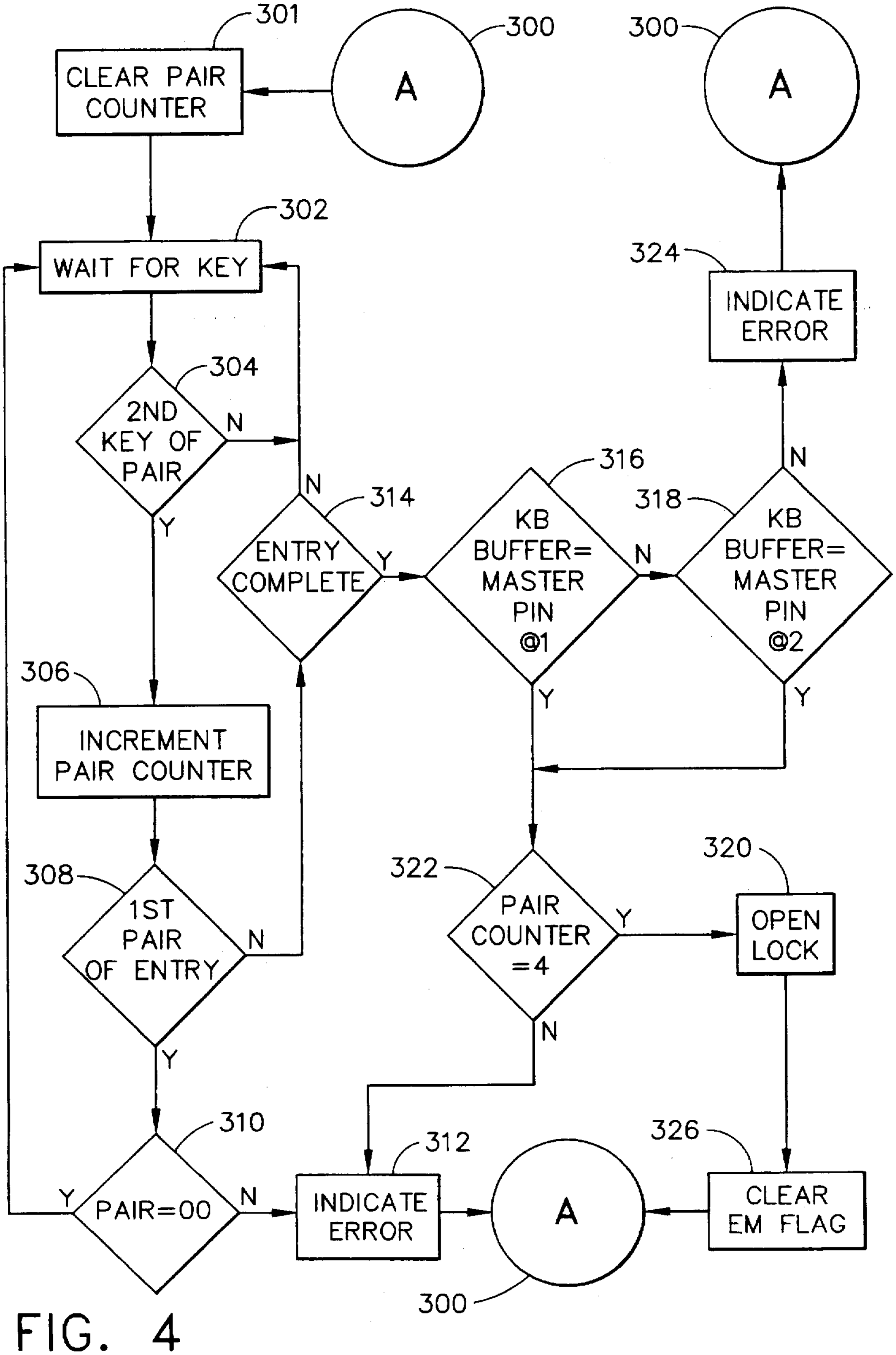
FIG. 4 is a flow diagram of the operation of the microprocessor upon the detection of an error mode flag.

If the comparison in operation 112 results in a compare equal condition, then the flow of the system operation is directed to the subroutine in FIG. 4, indicated in operation 114. However, in the event that the new CRC and the old CRC compared in operation 112 results in a negative compare, then the flow branches to operation 116 wherein the error count is incremented.

Referring back to operation 108, wherein the read or retrieved data was compared with the buffered data, if that comparison is a no-compare, then the flow is from operation 108 to operation 116. Upon a flow from either operation 108 or operation 112 to operation 116, an error count is incremented by a quantity of one and then the error count tested in operation 118 to determine whether the count presently stored as an error count is equal to three. By determining whether the count is equal to three, the process can be looped for up to three times without endlessly winding up in an error loop. If operation 118 results in an error count of less than three, then the flow branches to operation 102 where the subroutine continues. By continuing the operation through operations 102, 104, 106, 108 and 116, it is possible that the erroneous data retrieved from the storage location in EEPROM 16 resulted from a transient condition; and upon a further rereading, the result will be data retrieved which will favorably compare with the buffered data in operation 108 and the process can continue in a normal fashion.

However, if after three attempts to read and compare the read or retrieved data with the buffered data at operation 108 there is a no-compare condition It is assumed that the retrieval of valid data from that data storage location is impossible and, accordingly, an error mode (EM) flag is checked to see if it has been set. If the error mode flag has not been set as determined in operation 120, then the flow branches to operation 122 where an error mode flag is set and the control operation continues to operation 124, where an error is shown and the program is continued at operation 114 in FIG. 4. However, if the error mode flag has been previously set, then there is continuation at operation 114, to FIG. 4.

Referring again to FIG. 3, the subroutine for reading data from EEPROM 16 will be described. The subroutine starts at operation 200 where the routine is started and the error count is cleared. Thereafter, the data in a particular, predesignated storage location in EEPROM 16 is read along with the associated CRC byte, in operation 202, and the data retrieved is used to calculate a CRC byte for that data in operation 204. The calculated CRC byte and the read or retrieved CRC byte are compared in operation 206 as a validity check to ensure that the data read from the memory is valid.

The result of the comparison of the two CRC bytes in operation 206 will determine further actions. In the event that the two CRC bytes compare favorably, in operation 206, then at operation 208 the program flow is to the subroutine in FIG. 4 in operation 300. In operation 208, the data which has been read in operation 202 and verified in operation 206 is processed by the routine that called for the data read.

However, in the event that the calculated and read CRC bytes do not compare favorably in operation 206, an increment in the error count is accomplished in operation 210 and the incremented error count is checked for equality with three, in operation 212. Operation 212 is used to prevent a continuous loop. In the event that the error count is not equal to three, then the flow branches back to operation 202 where the data again is read, along with the CRC byte from EEPROM 16, and subsequent operations continue. In the event that the CRC byte did not check due to a transient condition, it is possible that on the second or third read attempt that the transient condition will no longer exist and a valid data read will occur.

Until the program control has looped through operations 202, 204, 206, 210, and 212 and until the error count equals three as determined in operation 212, the operation will continue to loop. Upon a determination that the error count is equal to three in operation 212, it is concluded that the erroneous read operations are not due to a transient condition and, accordingly, it is futile to attempt to further retrieve data from the memory location. Thereupon, the flow from operation 212 is to operation 214 where the error mode flag set question is posed. If the error mode flag has previously been set, the flow is to return normally in operation 208. If, however, the error mode flag has not been previously set, the logic flow branches at operation 214 to operation 216 where the error mode flag is set and thereafter the lock is commanded to show an error condition in operation 218. The program flow is from 218 to operation 300.

Figure 3:
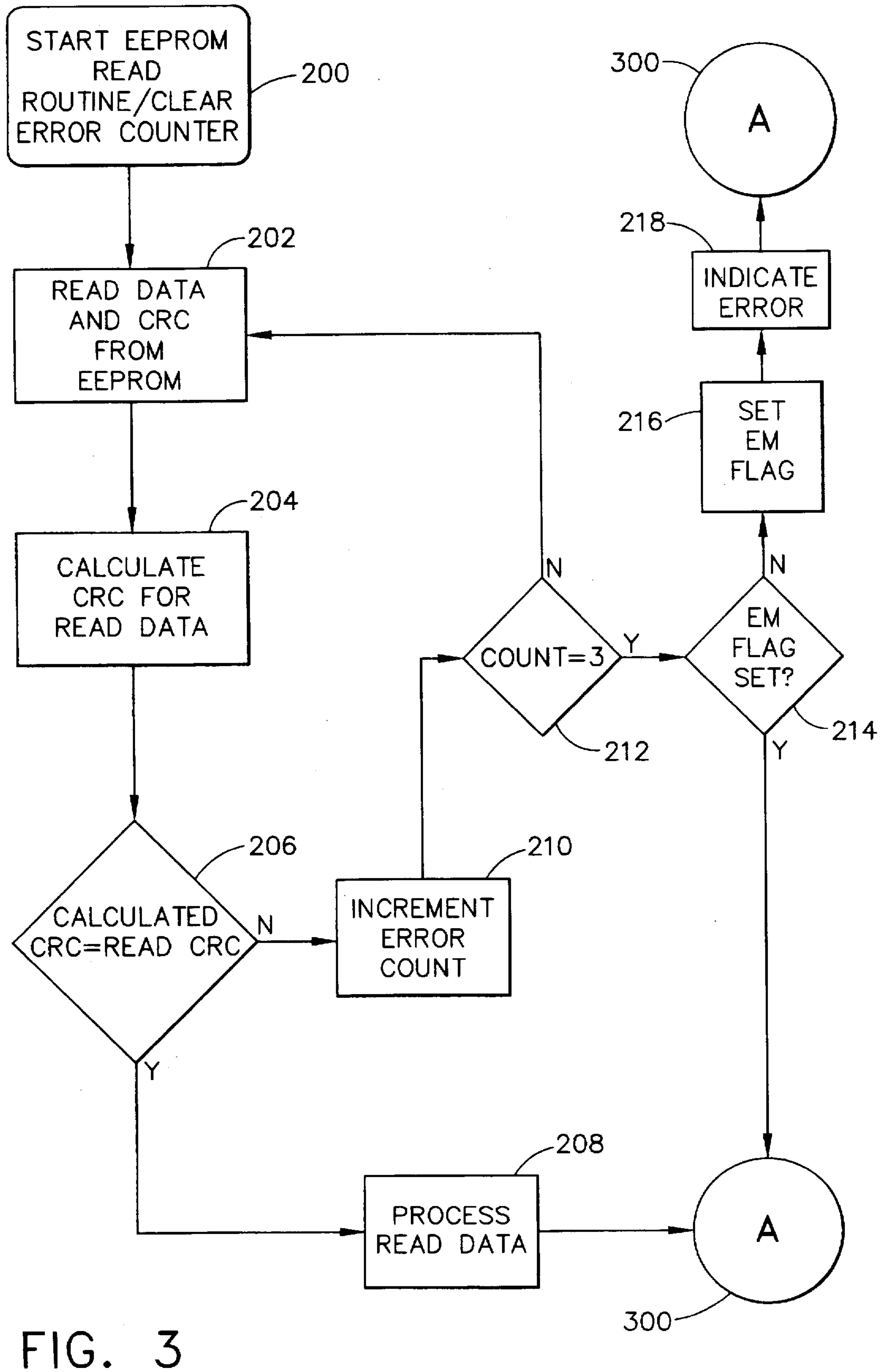
FIG. 3 is a flow diagram of a subroutine for the reading or retrieval of data from the data storage memory of the lock.

The subroutine in FIG. 3 acts to test the data read from the memory on three specific read cycles and then set an error mode flag in the event that a valid read cannot be obtained from any one data storage location in the EEPROM 16.

Referring now to FIG. 4, the subroutine which may provide an entry into the lock and container following a corruption of combination data stored in EEPROM 16 is illustrated. Following the operation in FIG. 3, where the error mode flag was set in operation 216 as a result of three consecutive read errors, the flow is to operation 300 in FIG. 4. Upon entry into the subroutine at operation 300, the pair counter is cleared in operation 301 and the lock 10 awaits a key input at operation 302. Operation 302 will merely hold the operation of the lock until a key input is entered at which point a determination is made at operation 304 as to whether the key input is the second key of a pair. In the event that the key entry is the first of a pair of numerical inputs into the lock, then the flow will branch and loop from operation 304 back to operation 302 and await an additional key input.

Upon the entry of the second key input of a pair, the decision in operation 304 will be in the affirmative and the pair counter is incremented in operation 306.

Thereafter flow will be to operation 308 wherein the determination is made as to whether the pair of key inputs just received is the first pair of a combination entry. If the combination entry is a first pair, then the flow branches to operation 310 where the contents of that entry are checked to determine if it is, for example, "00." Since all emergency combinations, by definition, start with "00" (or other predesignated two digit number as the first pair, then if the first pair is other than "00" immediately the lock will indicate that an error has occurred and the flow is to operation 300. However, if the entry does in fact represent the first pair of an emergency combination; i.e., first pair "00," then the flow is looped back to operation 302 where the lock then will await further keyed entries.

In the event that in operation 308 the determination is that the pair being considered is not the first pair; i.e., it is a second, third or fourth pair of numbers, then a determination is made in operation 314 as to whether the entire entry is complete; for example, have four pairs of digits been entered? In the event that the entry is not complete, then the flow branches back to operation 302 to await further key inputs.

Conversely, if the entry is complete and four pairs of numbers have been entered, then the keyboard buffer combination is queried and is compared against the master combination PIN or Personal Identification Number, the last six digits of the combination, in storage location one. The information keyed into the lock by the operator, the entry, is stored in a keyboard buffer and the buffer contents are available for comparison.

The master PIN stored at storage location one is retrieved from EEPROM 16 by the read routine discussed and described earlier with respect to FIG. 3. In the event that the master combination or the master PIN number is incorrect, then a second read operation is performed at storage location two wherein the master combination has been redundantly stored. The double or redundant storage is for the purpose of increasing the probability of being able to retrieve a valid master combination. Even though part of the EEPROM 16 may be corrupted, it is very possible that another part of the EEPROM 16 remains uncorrupted and can produce a validly read master PIN. In the event that the keyboard buffer contents compare favorably with the master PIN stored at either location one, operation 316 or location two, operation 318 the logic control branches to operation 322 to verify that all four parts of the emergency combination were entered and then to an open lock operation 320. If all four pairs have not been entered then the flow branches to operation 312 to indicate an error. In the event that the contents stored in either of master PIN location one and master PIN location two do not compare favorably with the keyboard buffer information, then an error is indicated at operation 324 and the program flows back to operation 300.

After the lock is opened at operation 320, the error mode flag is set at operation 326.

The operation of the microprocessor 12, in accordance with the subroutines disclosed and described in FIGS. 2, 3 and 4, effectively prevents the use of the master combination to open the lock until such time as it has been determined that an effort has been made to read a particular storage location in the EEPROM 16 and a further determination has been made that it is not possible to validly recover the data stored in that storage location.

Only upon a finding of a plurality of invalid read operations for the storage location of an authorized combination will the microprocessor be conditioned, under program control, to accept the master combination for purposes of opening the lock. At all other times, the lock is incapable of being opened with the master combination.

If the memory 16 is uncorrupted and operates properly and provides valid reads as confirmed by proper CRC bytes and the combination does not compare with the retrieved data, that is not considered a condition which will result in the accessing of the master combination for purposes of opening the lock.

The master combination can reside in the possession of a sole individual for purposes of control and, accordingly, the master combination can be controlled by that individual with the lock remaining very secure.

In the event that the master combination becomes known, it will be ineffective to open the lock until such time as the lock indicates that there has been a memory read error or a corruption of the data stored in the memory; and even if an individual is in possession of the master combination, until such time as there has been a memory read error in the EEPROM 16, the master combination cannot be used to open the lock.

While the invention disclosed and described herein has been described with respect to a particular flow diagram, one skilled in the art of programming will recognize that changes in techniques and approach, desired or required for a particular microprocessor, may be used to accomplish the same results as the flow diagrams and subroutines described herein without departing from the scope and spirit of the invention as set forth in the appended claims.

We claim:

1. An electronic lock comprising:

a bolt control;

a combination input;

an electronic control for receiving a combination entered through said combination input and controlling said bolt control;

said electronic control including a microprocessor and a memory for storing data required for comparison to validate a combination;

said microprocessor including program control to perform operations comprising:

reading said memory for selected data stored therein;

checking said read data for validity;

detecting invalidity of data when said checking operation fails;

conditioning said microprocessor to accept an emergency combination when and only when said microprocessor is so conditioned;

thereby rendering the lock unlockable when said memory only outputs invalid data when a combination is retrieved from said memory during an attempted opening cycle of said lock.

2. The electronic lock of claim 1 wherein said conditioning operation includes:

setting an indication of the inability of the electronic controls to retrieve valid data from said memory;

responsive to said indication, accepting a combination for comparison where said combination of comparison contains values uniquely associated with a control operation of said microprocessor which is enabled only upon detection of said indication;

reading a predesignated combination from a first memory location;

comparing said predesignated combination with said combination accepted for comparison and if a compare equal exists, opening said lock; and responsive to a no compare of said predesignated combination and said combination accepted for comparison, retrieving a second predesignated combination from a second memory location for further comparison.

3. A method of electronic lock operation comprising:

detecting a reading of invalid data from a data storage memory;

responsive to said detecting step, storing in a first memory location an indicator of invalid data being retrieved from a second memory location;

responsive to detection of said indicator, conditioning said lock to accept a combination having a unique characteristic;

entering said combination having a unique characteristic; and comparing said combination with data retrieved from a plurality of storage locations having been written with common data and opening the lock upon the first of said comparing operations to compare favorably.

4. A method of electronic lock operation comprising:

reading a memory to retrieve a stored first lock combination;

testing to verify the validity of said retrieved first combination;

responsive to an unfavorable outcome of said testing, conditioning said lock to accept for the purpose of unlocking said lock a second combination which is otherwise inoperative to open the lock.

5. The method of electronic lock operation of claim 4 further comprising the steps of:

reading a third combination from a predesignated first memory location of a memory of said lock;

verifying validity of said retrieved third combination;

responsive to a favorable verification of said third combination, comparing said third combination with said second combination and upon a compare equal opening said lock.

6. The method of electronic lock operation of claim 5 further comprising the steps of:

responsive to an unfavorable verification of said third combination, reading said third combination from a second predesignated location of a memory of said lock;

verifying validity of said retrieved third combination from said second location;

responsive to a favorable verification of said third combination, comparing said third combination with said second combination and upon a compare equal opening said lock.

* * * * *